United States Patent Office 3,125,712
Patented Mar. 17, 1964

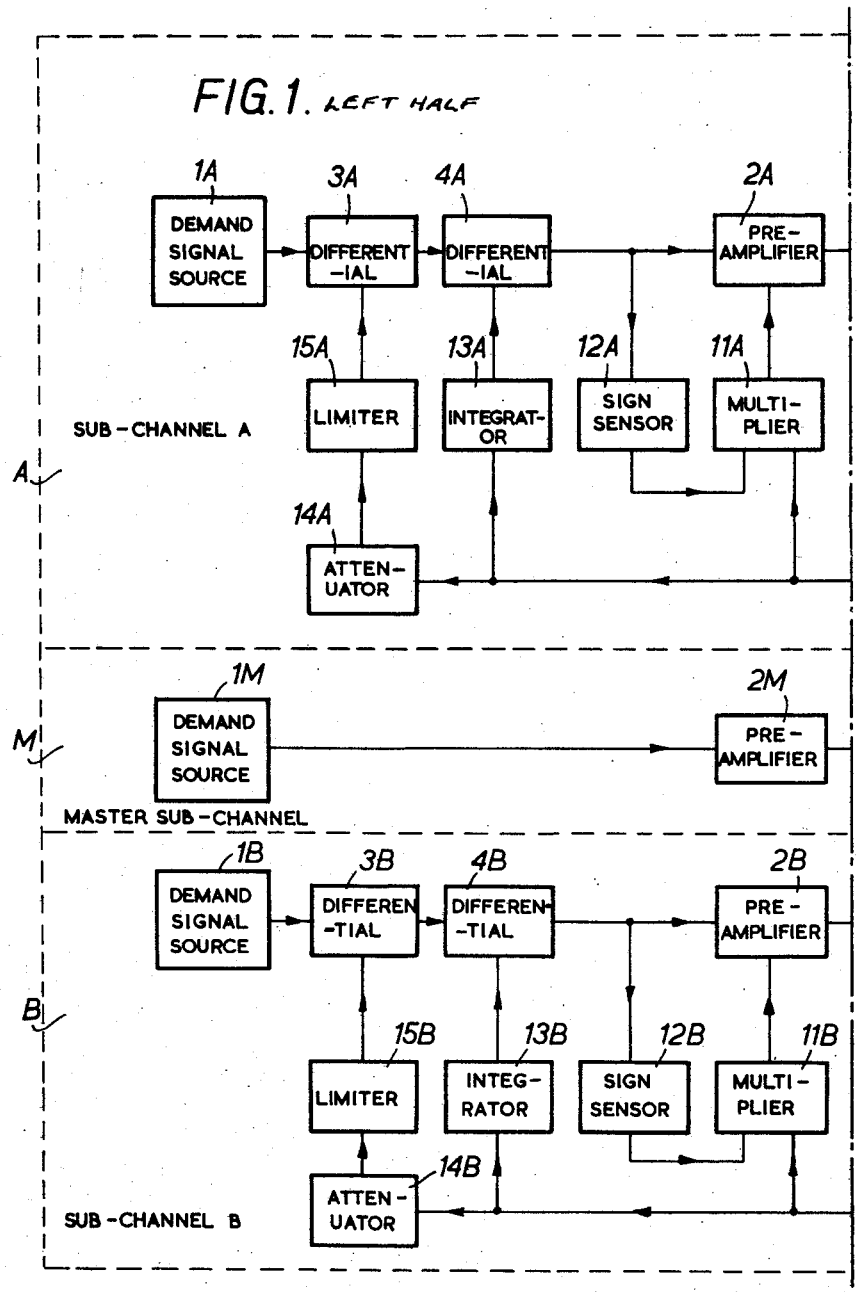

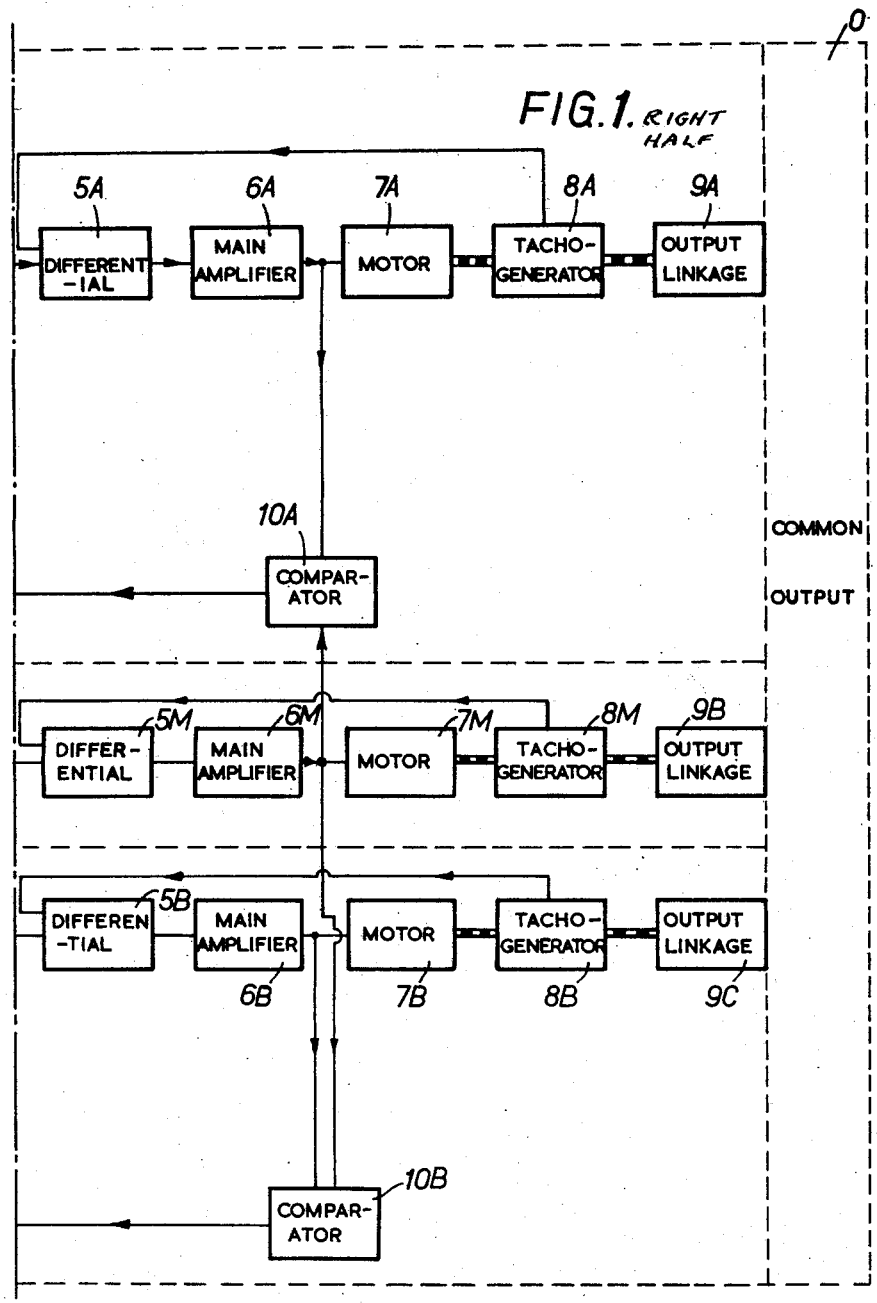

3,125,712
PLURAL CHANNEL POSITIONAL SERVO SYSTEMS
Dennis Lello Meredith, Cheltenham, England, assignor to S. Smith & Sons (England) Limited, London, England, a British company
Filed Dec. 12, 1961, Ser. No. 158,842
Claims priority, application Great Britain Dec. 21, 1960
4 Claims. (Cl. 318—19)

The present invention relates to servo systems of the kind (hereinafter referred to as the kind specified) having a plurality of independent sub-channels which are arranged to actuate a common output in dependence upon a common demand quantity.

Such servo systems may be employed, for example, in automatic pilots for aircraft. It is usual in automatic pilots to provide servo channels for positioning the control surfaces in response to demand signals generated firstly to stabilise the aircraft's flight and secondly, if required, to manoeuvre the aircraft in some chosen manner. In a conventional aircraft having elevators, ailerons and a rudder, a separate servo channel is provided for each. For greater reliability in operation it has been proposed that each automatic pilot servo channel shall be one of the kind specified having a plurality of identical, or effectively so, sub-channels operating in parallel. The sub-channels may have independent but identical signal sources but actuate a common output.

Where the outputs are mechanical movements, for example, the drive shafts of servo motors, the linkage between each sub-channel and the common output may include some force responsive device which operates to disconnect any sub-channel in which, because its output disagrees with those of the others, the force transmitted by the output exceeds a pre-determined limit. Where such an arrangement is employed, some measure must be employed to equalise and balance the operation of the different sub-channels, preferably so that reasonable differences in their characteristics which may arise during operation, do not give rise to unnecessary disconnection of subchannels. If this is done, disconnection will result only from faults arising in the subchannels giving rise to differences in the subchannel outputs.

It is an object of the present invention to provide servo systems of the kind specified in which the necessary equalising and balancing is effected.

This application is a continuation-in-part of copending application Serial No. 759,360, filed September 5, 1958, now Patent No. 3,054,039.

Reference is also made to United States Letters Patent No. 2,686,285 granted to F. W. Meredith and F. R. Milsom on August 10, 1954, for "Multiple Channel Safety Control for Automatic Aircraft Pilots."

According to the present invention, in a servo system of the kind specified, each subchannel, except one which is designated the master sub-channel includes a servo amplifier comprising a variable gain pre-amplifier and a main amplifier coupled in cascade in the order specified, means for applying the demand signal for the sub-channel to the input of the pre-amplifier, means for applying the output of the main amplifier to energise a servo-motor which is coupled to actuate the common output, a comparator to which the output of the main amplifier is applied together with the output of an amplifier in the master sub-channel to derive a signal representing the discrepancy between the two amplifier outputs applied to it, means for applying the discrepancy signal to vary the gain of the pre-amplifier in such a manner as to reduce any discrepancy towards zero, and means for feeding one or more signals derived from the discrepancy signal back to the pre-amplifier in such a manner as to reduce the discrepancy towards zero.

One signal which may be fed back to the preamplifier is a signal derived from the discrepancy signal by integration thereof. Another signal which may be fed back to the pre-amplifier is a signal derived from the discrepancy signal by passing it through a limiter arranged to prevent the amplitude of the signal fed back to the pre-amplifier exceeding a pre-determined value. Preferably, both these signals are fed back to the pre-amplifier.

The master sub-channel will usually be identical with the other sub-channels with the exception that there is no comparator associated with it and that the pre-amplifier is either a fixed gain amplifier or is omitted altogether.

Where a high degree of reliability is required in operation, it may be arranged that failure of the master sub-channel giving rise to certain predetermined fault conditions will result automatically in the actuation of switches arranged so that the master channel is put out of operation and one of the other sub-channels becomes the master sub-channel for the other sub-channel or sub-channels remaining in operation.

Preferably there are not less than three sub-channels in order that if one sub-channel fails, the servo system may remain in operation with two or more operative sub-channels, thus permitting monitoring by comparison between the remaining sub-channels. However, the present invention is also applicable to a system including only two sub-channels, one of which is the master sub-channel.

A servo system in accordance with the present invention and having three sub-channels will now be described by way of example with reference to the accompanying drawing in which:

Both halves of FIGURE 1 show a block diagram of the system.

Referring now to FIGURE 1 of the accompanying drawing, there is shown a block circuit diagram of a servo system which forms one channel of an autopilot system for an aircraft, for example the elevator channel, and has three sub-channels which respond to a common demand quantity and actuate a common output. The particular autopilot system to be described is of the type known as a "rate/rate" system in which the demand signal is one representing the rate of movement of the control surfaces required to overcome any disturbances of the aircraft's flight condition and/or to fly along a required path. It will be appreciated, however, that the present invention is equally applicable to other types of autopilot servo systems, for example position control systems, and also to servo systems other than autopilots.

The three sub-channels M, A and B of the system are shown in separate blocks in FIGURE 1, these blocks having a dotted outline and being given the corresponding references M, A and B. The common output is similarly indicated by a dotted block O. The sub-channel M is normally the master sub-channel of the system. As each of the sub-channels includes identical constituent items, these are given the same numerical reference for each sub-channel with the appropriate affix M, A or B. Where, in this description, all the identical items of the three subchannels are referred to simultaneously the appropriate numerical reference alone will be used.

Each of the sub-channels includes a demand signal source 1 which is identical with those of the other sub-channels but independent from it. In known manner each may include a combination of rate gyroscopes, pendulum monitors and other sources of signals for generating a composite demand signal for control of the aircraft's elevators either to maintain a given flight condition or to fly along a selected path. They may also include in known manner means for including in the demand signal suitable proportions of signals which are derivatives with respect to time or the integral of a generated signal. In the case of the master sub-channel, the output of the signal source 1M is applied directly to a preamplifier 2M which is of fixed gain, whereas in the case of the sub-channels A and B, the outputs from the signal source 1A and 1B are fed to variable gain pre-amplifiers 2A and 2B through a pair of differentials 3A and 4A or 3B and 4B respectively. In the differentials 3 and 4, the signals from the signal sources 1A and 1B are combined in a manner to be described in detail below with signals fed back from other elements in the sub-channel and it will be appreciated that differentials 3 and 4 although shown as separate blocks, may be combined together in a single circuit which may itself form part of the input circuits of the pre-amplifiers 2A and 2B. The differentials 3 and 4 may simply be circuits for adding signals in the appropriate sense.

The outputs of the pre-amplifiers 2, are applied to differentials 5, the outputs of which are applied to the main amplifiers 6 of the sub-channels. The differentials 5 like the differentials 3 and 4 may simply be signal adding circuits to which the signals are applied in the appropriate senses and they may also be incorporated in the input circuits of the amplifiers 6. The outputs of the main amplifiers 6 are themselves applied in known manner to energise servo motors 7, the output shafts (shown as chequered connections in FIGURE 1) of which drive tachometer generators 8 and output linkages 9. The linkages 9 are coupled to the common output O of the servo system. The outputs of the tachometer generators 8 are fed back to further inputs of the differentials 5, these outputs being signals representing the rate of rotation of the servo motors 7 as required in the "rate/rate" type of autopilot servo system being described. In a position control system of course the feed back signal generators would be pick-offs for generating signals representing the positions of the shafts of the servo-motors 7.

The output linkages 9 may in known manner include electromagnetic clutches, gearing and torque limiting switches, the latter having switch contacts connected in the energising circuits of the clutches and being arranged to de-energise the clutch of any sub-channel which is in violent disagreement with the others. The clutch switching circuits may for example be as described in the Specification of U.S.A. application Serial No. 81,529 whereby if one sub-channel is in disagreement with the other two its clutch is de-energised but, if subsequently, there is a disagreement between the other two, both clutches are de-energised.

Each of the sub-channels A and B includes a comparator 10. In the case of the comparator 10A this is supplied with signals from the outputs of the main amplifier 6A of sub-channel A and of the main amplifier 6M of the master sub-channel M. The comparator 10A generates a signal representing the discrepancy between the two amplifier outputs applied to it, which signal is used within the sub-channel A to vary its transmission characteristics in such a manner as to reduce the discrepancy towards zero. Firstly, the output of the comparator 10A is fed to a multiplier 11A the output of which is applied to the pre-amplifier 2A to vary its gain. The multiplier 11A is also fed with the output of a sign sensor circuit 12A, the input of which is coupled to the input of the pre-amplifier 2A. The sign sensor circuit 12A operates in known manner to produce one of two pre-determined signals at its output depending on the sign of the signal applied to its input, the output signals being independent of the amplitude of the input signals. The multiplier 11A takes account of the output signal of the sign sensor circuit 12A to change the sign of its output signal in dependence upon the sign of the signals being applied to the input of pre-amplifier 2A.

It will be appreciated that if the gain of pre-amplifier 2A is to be varied to reduce any discrepancy between the outputs of the amplifiers 6A and 6M, account has to be taken of the sign of the input signals and the sense in which comparator 10A operates (i.e. whether it produces a positive or a negative output when the output of amplifier 6A is more positive than the output of amplifier 6M). Thus, for example, if the input to the pre-amplifier 2A is positive, the output of amplifier 6A is the more positive, and comparator 10A in consequence produces a negative discrepancy signal, multiplier 11A will have to respond to the output produced by sign sensor 12A in response to a positive signal to apply the discrepancy signal without inversion to the pre-amplifier 2A to reduce its gain and thus to reduce the discrepancy signal towards zero. With this sensing, the output from sign sensor 12A in response to a negative input to pre-amplifier 2A will cause inversion of the discrepancy signal in multiplier 11A, and it will be seen that this results in the gain always being adjusted in the required manner. Other combinations are possible. For example, if the discrepancy signal is positive when the output of amplifier 6A is more positive (or less negative) than that of amplifier 6M, inversion in multiplier 11A will have to occur for positive inputs to pre-amplifier 2A.

In addition signals, derived from the discrepancy signal are fed back to the input of the preamplifier 2A by two different paths. The first of these paths includes an electro-mechanical integrator 13A which feeds a signal representing the integral of the discrepancy signal to an input of the differential 4A. The second of these paths includes an attenuator 14A and a limiter 15A and feeds back an attenuated and limited version of the discrepancy signal to an input of the differential 3A.

It will be seen that in sub-channel B, precisely similar arrangements are made to utilise the discrepancy signal generated in the comparator 10B which is fed with signals from the outputs of the amplifiers 6M and 6B. For this purpose, the sub-channel B includes a multiplier 11B, a sign sensor 12B, an integrator 13B, an attenuator 14B and a limiter 15B.

The signals applied to the pre-amplifiers 2A and 2B from multipliers 11A and 11B to vary their gains are sensed so that the gains are varied in such a manner as to tend to reduce any discrepancy signal generated in the comparators 10A and B towards zero and in effect varies the proportions of the demand signal outputs from sources 1A and 1B which are fed to the inputs of the servo loops constituted by the elements 5A—8A and 5B—8B of the sub-channels concerned in such a manner as to tend to equalise the output of the main amplifiers 6A and 6B and the output of the main amplifier 6M of the master sub-channel. This is required to ensure that an equal or nearly equal output torque is obtained from each of the sub-channels in the event that there are reasonable and permissible differences in, for example, the sub-channel demand signals or the feed-back signals in the various sub-channels. As long as any or all of the differences remain within reasonable limits, the adjustment of the gains of pre-amplifiers 2A and 2B can operate to maintain the output torques nearly equal. Where, however, any of these differences becomes excessive, the control of the pre-amplifier gains will be insufficient to equalise the outputs of the sub-channels and one or more of the torque limiting switches in the output linkages 9 will operate in consequence.

By feeding back signals derived from the discrepancy signals produced in the comparators 10 to the inputs of the pre-amplifiers 2A and 2B in such a sense as to tend to reduce the discrepancy signals towards zero (i.e. if, for example, the output of amplifier 6A is more positive than that of amplifier 6M, the sense will be such that the signals fed back to the pre-amplifier 2A will reduce the output of amplifier 6A), the transmission characteristics of the sub-channels are varied in such a manner as to prevent reasonable and permissible datum errors in any of the sub-channels from causing maladjustment of the control surface which is controlled by the servo system or causing one or more sub-channels to be put out of action by the torque limiting switches in consequence of a large difference in the outputs produced by the various sub-channels. The datum errors may for example include datum errors in the tachometer generators 8 (or other feedback signal generators in other types of servo systems) or the main servo amplifiers 6 or datum drifts or errors in the various signal sources included in the demand signal sources 1. The errors may be long term errors which accumulate slowly over long periods and these are balanced by the integrated signals fed back to the pre-amplifiers 2A and 2B by the integrators 13. The latter must, however, have a suitably limited authority. There may also be datum errors which cause short term and suddenly introduced demand signal differences (for example datum errors in radio altimeters which are switched into use in the demand signal sources 1 during the flare phase of an automatic landing). These may be such that they can be only partially compensated for by adjustment of the gains of the pre-amplifiers 2A and 2B and the additional compensation required is achieved by the signals fed back through the limiters 15 to the inputs of the pre-amplifiers 2A and 2B. The limiters 15 are set so as suitably to limit the effect of these feedback signals.

The integrators 13 will have essentially to be electromechanical rather than electronic integrators since it will be necessary that the outputs be stored indefinitely when the sub-channel is dis-engaged. In known manner therefore the integrators 13 may each include a servo amplifier and motor and a tachometer generator coupled to the output shaft of the motor. The signals to be integrated are fed to the input of the amplifier together with, but in opposition to, the output of the tachometer generator. The output of the integrator is represented by the position of the motor shaft and this is converted to an electrical signal by a suitable pick-off device responsive to the angular position of the shaft, or a member driven by the shaft, through a suitable linkage.

If required, the signals from the source 1M may be fed to the input of an integrator, similar to the integrators 13, an output signal from which is fed to the one input of a differential, the output of which is coupled to the input of the preamplifier 2M and the other input of which is coupled to the output of the signal source 1M (these connections between the source 1M and the amplifier 2M replace that shown in FIGURE 1).

It will be appreciated that although the system described is one in which the signals are D.C. signals, the invention is equally applicable to one in which the signals are modulated A.C. signals, the addition of modulators and demodulators, reference voltage supplies and other necessary features being carried out in known manner. In addition, whilst the pre-amplifiers 2 are referred to as amplifiers it will be appreciated that they need not necessarily be high gain devices and that they may have a gain of unity or less. The amplifiers 2 and 6 may take any required form and may be for example thermionic valve, transistor or magnetic amplifiers, whilst the other circuits may take any convenient and suitable form. Further, although the servo system described forms part of an automatic pilot for aircraft, servo systems according to the present invention are applicable to many other types of control systems.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A servo system of the kind having a plurality of independent sub-channels which are arranged to actuate a common output in dependence upon a common demand quantity, the system comprising a master sub-channel and a plurality of further sub-channels; the master sub-channel including an amplifier, means for applying a signal representing the common demand quantity to the amplifier, a servo motor energized by the amplifier, and means coupling the motor to actuate the common output; and each further sub-channel including a servo amplifier comprising a variable gain pre-amplifier and a main amplifier coupled in cascade in the order specified, means for applying a signal representing the common demand quantity to the input of the pre-amplifier, a servo motor, means for applying the output of the main amplifier to energize the servo motor, means coupling the servo motor to actuate the common output, a signal comparator responsive to the outputs of the main amplifier and the amplifier of the master sub-channel to derive a signal representing the discrepancy between the two outputs, sign-sensor means responsive to the sign of the signal applied to the input of the pre-amplifier to derive a signal dependent upon said sign, means for varying the gain of the pre-amplifier in response to an applied signal, multiplier means responsive to the signal derived by the comparator and the signal derived by the sign-sensor means to supply the signal derived by the comparator means to the gain-varying means in a sense dependent upon the signal derived by the sign-sensor means so as to tend to reduce the discrepancy towards zero, first feedback means for feeding back degeneratively to the pre-amplifier at least part of the discrepancy signal, and further means including an integrator for feeding back degeneratively to the pre-amplifier a signal derived as the integral with respect to time of the discrepancy signal.

2. A servo system of the kind having a plurality of independent sub-channels which are arranged to actuate a common output in dependence upon a common demand quantity, the system comprising a master sub-channel and at least one further sub-channel, the master sub-channel including an amplifier, means for applying a signal representing the common demand quantity to the amplifier, a servo motor energized by the amplifier and means coupling the motor to actuate the common output, and each further sub-channel including a servo amplifier comprising a variable gain pre-amplifier and a main amplifier coupled in cascade in the order specified, means for applying a signal representing the common demand quantity to the input of the pre-amplifier, a servo motor, means for applying the output of the main amplifier to energize the servo motor, means coupling the servo motor to actuate the common output, a signal comparator for generating a signal representing the discrepancy between two applied signals, means for applying the outputs of the main amplifier and the amplifier of the master sub-channel to the comparator, means for varying the gain of the pre-amplifier in response to an applied signal, means for applying the discrepancy signal to said gain varying means in the sense required to reduce the discrepancy towards zero, and two feedback paths for deriving from the discrepancy signal two feedback signals respectively and for applying the two feedback signals to the pre-amplifier in the sense required to reduce the discrepancy signal towards zero, a first of the two feedback paths including a limiter which is responsive to the discrepancy signal to pass the discrepancy signal limited in amplitude to the pre-amplifier as a first of said feedback signals, and the second feedback path including an integrator which is responsive to the diecrepancy signal to supply to the pre-amplifier as the second of said feedback signals a signal dependent upon the integral with respect to time of the discrepancy signal.

3. The combination set forth in claim 1, said first feedback means comprising a signal path having a limiter, means to supply the discrepancy signal to said limiter and means supplying the output of said limiter to said pre-amplifier.

4. The combination set forth in claim 2, wherein said second feedback path comprises means for feeding the discrepancy signal to said integrator and means for feeding the output of said integrator to said pre-amplifier.

References Cited in the file of this patent

UNITED STATES PATENTS 3,054,039    Meredith _____ Sept. 11, 1962